(12) United States Patent
Chuang et al.

(10) Patent No.: US 8,914,907 B2
(45) Date of Patent: Dec. 16, 2014

(54) ELECTRONIC DEVICE FOR PROTECTING DATA

(71) Applicants: Chih-Fu Chuang, New Taipei (TW); Wen-Ching Hsiao, New Taipei (TW); Yu-Jyun Lin, New Taipei (TW)

(72) Inventors: Chih-Fu Chuang, New Taipei (TW); Wen-Ching Hsiao, New Taipei (TW); Yu-Jyun Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 187 days.

(21) Appl. No.: 13/653,433

(22) Filed: Oct. 17, 2012

(65) Prior Publication Data

US 2013/0104250 A1 Apr. 25, 2013

(30) Foreign Application Priority Data

Oct. 19, 2011 (TW) .............................. 100137813 A

(51) Int. Cl.
*G06F 12/16* (2006.01)
*G06F 21/74* (2013.01)
*G06F 7/04* (2006.01)
*G06F 12/00* (2006.01)
*G06F 12/14* (2006.01)
*G06F 13/00* (2006.01)
*G06F 17/30* (2006.01)

(52) U.S. Cl.
CPC ...................................... *G06F 21/74* (2013.01)
USPC ................ 726/30; 726/17; 455/411; 455/558

(58) Field of Classification Search
None
See application file for complete search history.

(56) References Cited

U.S. PATENT DOCUMENTS

| | | | |
|---|---|---|---|
| 8,200,582 B1* | 6/2012 | Zhu | 705/64 |
| 2002/0166034 A1 | 11/2002 | Koschella | |
| 2003/0093698 A1* | 5/2003 | Challener et al. | 713/202 |
| 2003/0097596 A1* | 5/2003 | Muratov et al. | 713/202 |
| 2005/0213392 A1 | 9/2005 | Ganton | |
| 2007/0252675 A1* | 11/2007 | Lamar | 340/5.64 |
| 2009/0291711 A1* | 11/2009 | Hsu | 455/558 |
| 2010/0024028 A1* | 1/2010 | Baugher et al. | 726/17 |
| 2010/0317324 A1* | 12/2010 | Brown et al. | 455/411 |
| 2011/0239292 A1* | 9/2011 | Little et al. | 726/17 |

FOREIGN PATENT DOCUMENTS

CN 101489228 7/2009

* cited by examiner

*Primary Examiner* — Shin-Hon Chen
(74) *Attorney, Agent, or Firm* — Novak Druce Connolly Bove + Quigg LLP

(57) ABSTRACT

An electronic device generates an access signal according to user input. The electronic device includes a processor, a key circuit to generate a key signal according to press of the user, a storage unit to store data, a clock generator circuit to generate a clock signal, and a protection circuit. The protection circuit generates an enable signal or a disable signal according to the key signal and the clock signal to control the storage unit to unlock or lock, and transmits the access signal to the storage unit to access the data.

7 Claims, 4 Drawing Sheets

ELECTRONIC DEVICE FOR PROTECTING DATA

BACKGROUND

1. Technical Field

The disclosure relates to electronic devices, and particularly to an electronic device for protecting data.

2. Description of Related Art

Smart phones are very popular, and open operating systems, such as ANDROID®, are widely used. However, the open operating systems may include trojan programs, which results in risk of data of in electronic devices running the operating systems and causes information security risks.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
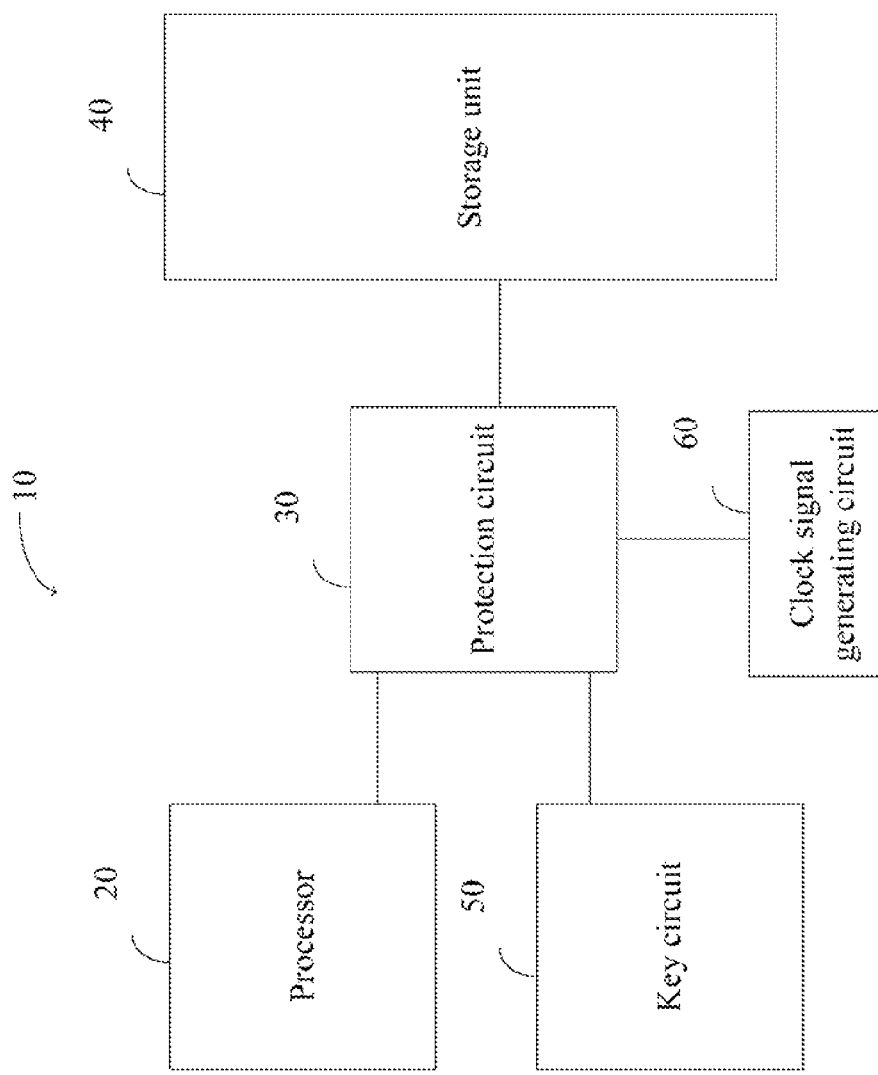
FIG. 1 is a schematic diagram of one embodiment of an electronic device including a protection circuit as disclosed.

FIG. 1 is a schematic diagram of one embodiment of an electronic device 10 as disclosed. In the embodiment, the electronic device 10 comprises a processor 20, a protection circuit 30, a storage unit 40, a key circuit 50, and a clock signal generating circuit 60.

The processor 20 generates an access signal to access data of the storage unit 40 according to user input. In one embodiment, the access signal is a low level voltage signal such as 0.1 volt (V). In one embodiment, the storage unit 40 comprises all memories of the electronic device 10 that has a storing function, such as a subscriber identity module card, and a secure digital memory card.

The key circuit 50 generates a key signal according to a press of a user, and the key signal is a low level voltage signal such as 0.1V. In one embodiment, the key signal can be generated by the key circuit 50 when the user presses a keyboard of the electronic device 10. In another embodiment, the key signal can be generated by the key circuit 50 when the user presses a touch screen of the electronic device 10. The clock signal generating circuit 60 generates a clock signal having a fixed (duty) cycle. The protection circuit 30 is electrically connected to the processor 20, the storage unit 40, the key circuit 50, and the clock signal generating circuit 60, to generate an enable signal or a disable signal according to the key signal and the clock signal, which controls the storage unit 40 to unlock or lock. In one embodiment, the enable signal may be a low level voltage such as 0.1 V, and the disable signal may be a high level voltage such as 0.4 V. The processor 20 generates the access signal according to the user input, to access the data of the storage unit 40 when the storage unit 40 is unlocked. In one embodiment, the access signal is a low level voltage such as 0.1V.

In one embodiment, the storage unit 40 is initially locked. The storage unit 40 is unlocked when the key circuit 50 generates the key signal maintaining at least N number of cycles for an odd number of times. That is the protection circuit 30 controls the storage unit 40 to unlock when the user presses a key of the keyboard maintaining at least N number of cycles for the odd number of times. In one embodiment, N is an integer. Value of N is a greatest number of cycles of the protection circuit 30 needs to delay. For example, N is two when the greatest number of cycles of the protection circuit 30 needs to delay is two. In one embodiment, an odd number of times means the first time, the third time, the fifth time. Thus, if the processor 20 generates the access signal, the protection circuit 30 transmits the access signal to the storage unit 40 to access the data of the storage unit 40. In one embodiment, the protection circuit 30 generates and sends the disable signal to the storage unit 40, to control the storage unite 40 lock when the key circuit 50 generates the key signal maintaining at least N number of cycles for an even number of times. Thus, no matter whether the processor 20 generates the key signal, the data of the storage unite 40 cannot be accessed. In one embodiment, an even times means the second time, the fourth time, the sixth time.

Figure 2:
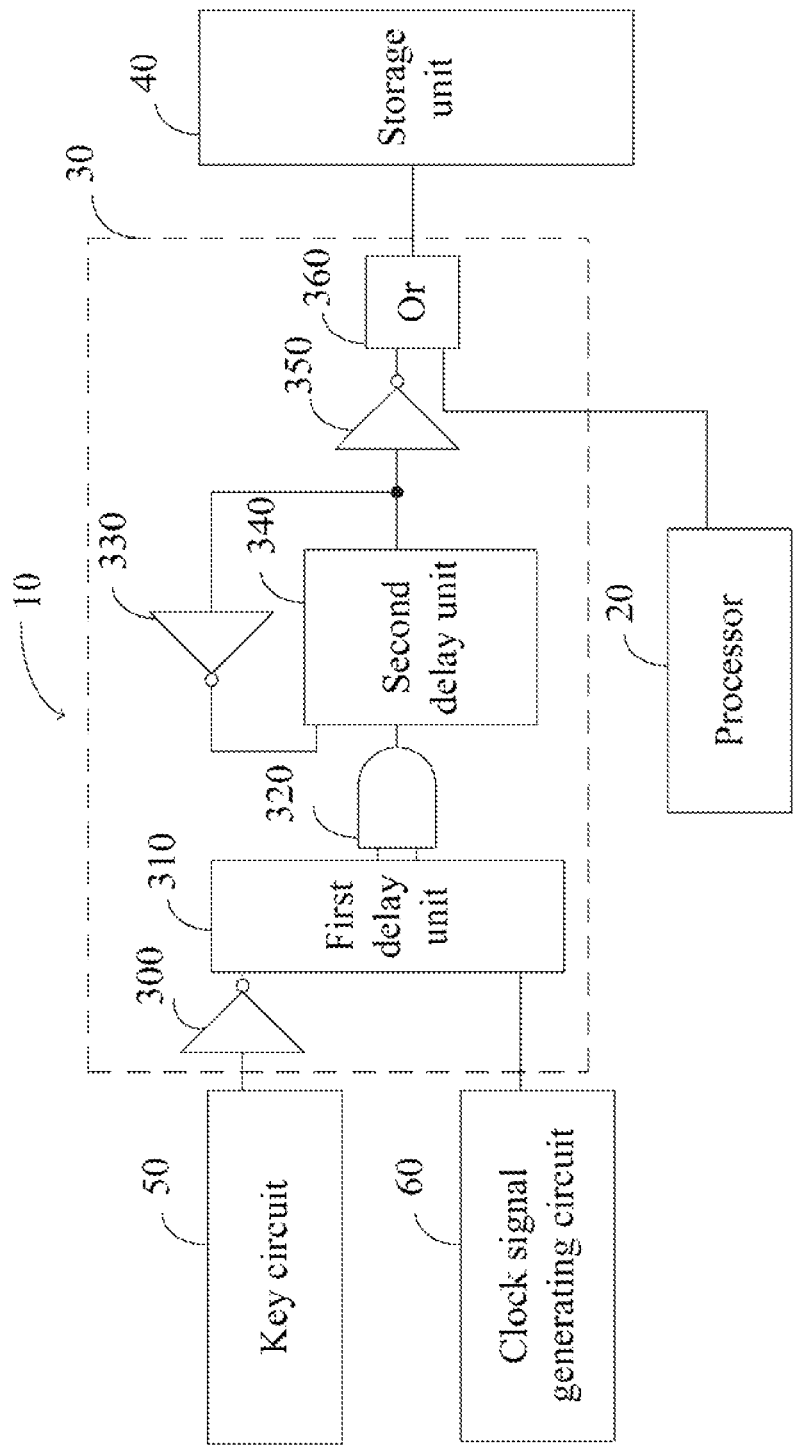
FIG. 2 is a schematic diagram of one embodiment of a protection circuit including a first delay unit and a second delay unit as disclosed.

FIG. 2 is a schematic diagram of one embodiment of the protection circuit 30 as disclosed. In one embodiment, the protection circuit 30 comprises a first NOT gate 300, a first delay unit 310, an AND gate 320, a second NOT gate 330, a second delay unit 340, a third NOT gate 350 and an OR gate 360. An input end of the first NOT gate 300 is connected to output end of the key circuit 50 to receive the key signal, and inverts the key signal to an inverted key signal.

The first delay unit 310 is connected to output end of the first NOT gate 300 and an output end of the clock signal generating circuit 60, to delay the inverted key signal and generates a plurality of delay signals such as a first delay signal, a second delay signal and a third delay signal. In one embodiment, the first delay signal is delayed one cycle, the second delay signal is delayed two cycles, and the third delay signal is delayed three cycles In one embodiment, the first delay unit 310 is triggered by the clock signal generated by the clock signal generating circuit 60. An input end of the AND gate 320 is connected to a plurality of output ends of the first delay unit 310, to receive the delay signals.

A first input end of the second delay unit 340 is connected to an output end of the AND gate 320 to be triggered by output of the AND gate 310, a second input end of the second delay unit 340 is connected to an output end of the second NOT gate 330, and an output end of the second delay unit 340 is connected to an input end of the second NOT gate 330. An input end of the third NOT gate 350 is connected to the output end of the second delay unit 340 to generate the disable signal or the enable signal, to control the storage unit 40 unlock or lock.

A first input end of the OR gate 360 is connected to an output end of the third NOT gate 350, and the second input end of the OR gate 360 is connected to the processor 20 to receive the access signal. An output end of the OR gate 360 receives the access signal generated by the protection circuit 30, and to transmits the access signal to the storage unit 40 when the storage unit 40 is unlocked.

The key circuit 50 does not generate the key signal until the key of the key circuit 50 is pressed, which means an initial level voltage of the output end of the AND gate 320 is a low voltage. The disable signal is a high level voltage such as 0.4 V, which means initial level voltage of the output end of the second NOT gate 330 and the output end of the third NOT gate 350 are both high voltages such as 0.4V. In one embodiment, the key circuit 50 generates the key signal maintaining for at least N number of cycles when the key of the key circuit 50 is pressed maintaining at least N number of cycles for the odd number of times. Thus, the first delay unit 310 generates N number of the high level voltage delay signals which are delayed 1 to N number of cycles, and then the level of the output end of the AND gate 320 from a low voltage to a high voltage, to trigger the second delay unit 340.

The second delay unit 340 delays an outputting signal outputted by the second NOT gate 330, and generates a delayed outputting signal to the input end of the second NOT gate 330 and the input end of the third NOT gate 350, and then the second NOT gate 330 inverts the delayed outputting signal to an inverted outputting signal. The outputting signal is a high level voltage and the inverted outputting signal is a low level voltage because the initial level voltage of the output end of the second NOT gate 330 is a high voltage. Correspondingly, level of the output end of the second NOT gate 330 and that of the third NOT gate 350 are both low voltages, which means the third NOT gate 350 outputs the enable signal causing the storage unit 40 is unlocked. Therefore, the protection circuit 30 transmits the access signal generated by the processor 20 to the storage unit 40, to access the data of the storage unit 40.

In one embodiment, the level of the output end of the AND gate 320 is a low voltage, and the second delay unite 340 is not triggered. Therefore, the level of the output end of the second NOT gate 330 and that of the third NOT gate 350 maintain pre-level when the key circuit 50 does not generate a key signal maintaining at least N number of cycles.

In one embodiment, the key circuit 50 generates the key signal maintaining at least N number of cycles when the key of the key circuit 50 is pressed maintaining at least N number of cycles for the even number of times. Thus, the first delay unit 310 generates N number of the high level voltage delay signals which are delayed 1 to N number of cycles, and then the level of the output end of the AND gate 320 from a low voltage to a high voltage, to trigger the second delay unit 340. The second delay unit 340 delays the inverted outputting signal generated by the second NOT gate 330. Level of the output end of the second NOT gate 330 and that of the third NOT gate 350 are both high voltages because the level of the inverted outputting signal is a low voltage, which means that the third NOT gate 350 outputs the disable signal causes the storage unit 40 to be locked. Therefore, the data of the storage unit 40 can not be accessed no matter whether the processor 20 generates the access signal to the storage unit 40.

In one embodiment, N is an integer. Value of N is the greatest number of cycles of the first delay unit 310 needs to delay. For example, N is five when the greatest number of cycles of the first delay unit 310 needs to delay is five, which means the second delay unit 340 is triggered, and the protection circuit 30 generates a enable signal or the disable signal to control the storage unit 40 unlock or lock when key circuit 50 generates the key signal maintaining at least five cycles.

Figure 3:
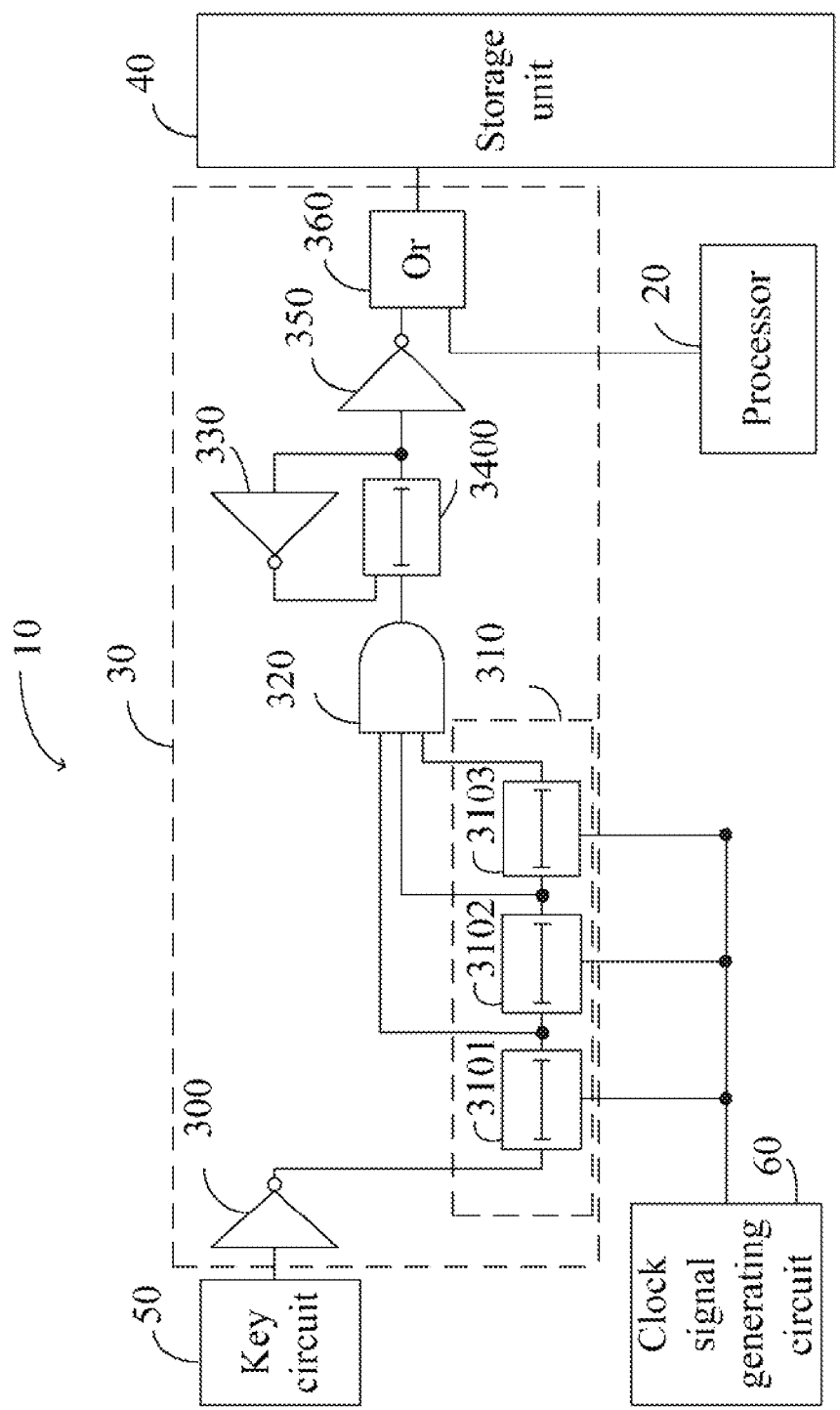
FIG. 3 is a circuit diagram of one embodiment of a first delay unit and a second delay unit as disclosed.

FIG.FIG. 3 is a circuit diagram of one embodiment of the first delay unit 310 and the second delay unit 340 as disclosed.

In the embodiment, N is three, and the first delay unit 310 comprises a first delayer 3101, a second delayer 3102, and a third delayer 3103. The first delayer 3101, the second delayer 3102, and the third delayer 3103 are used to delay signal for one cycle. A first input end of the first delayer 3101 is connected to the clock signal generating circuit 60 to receive the clock signal, a second input end of the first delayer 3101 is connected to the output end of the first NOT gate 300, and an output end of the first delayer 3101 is connected to a first input end of the AND gate 320. A first input end of the second delayer 3102 is connected to the clock signal generating circuit 60, a second input end of the second delayer 3102 is connected to the output end of the first delayer 3101, and an output end of the second delayer 3102 is connected to a second input end of the AND gate 320. A first input end of the third delayer 3103 is connected to the clock signal generating circuit 60, a second input end of the third delayer 3103 is connected to the output end of the second delayer 3102, and the output end of the third delayer 3103 is connected to a third input end of the AND gate 320.

In one embodiment, the second delay unit 340 comprises a fourth delayer 3400. An input end of the fourth delayer 3400 is connected to the output end of the AND gate 320 and the output end of the second NOT gate 330. The fourth delayer 3400 is triggered by the AND gate 320, and to delay the outputting signal and the inverted outputting signal outputted by the second NOT gate 330 for one cycle.

In one embodiment, the first delayer 3101, the second delayer 3102, the third delayer 3103, and the fourth delayer 3400 are all rising edge triggered.

Figure 4:
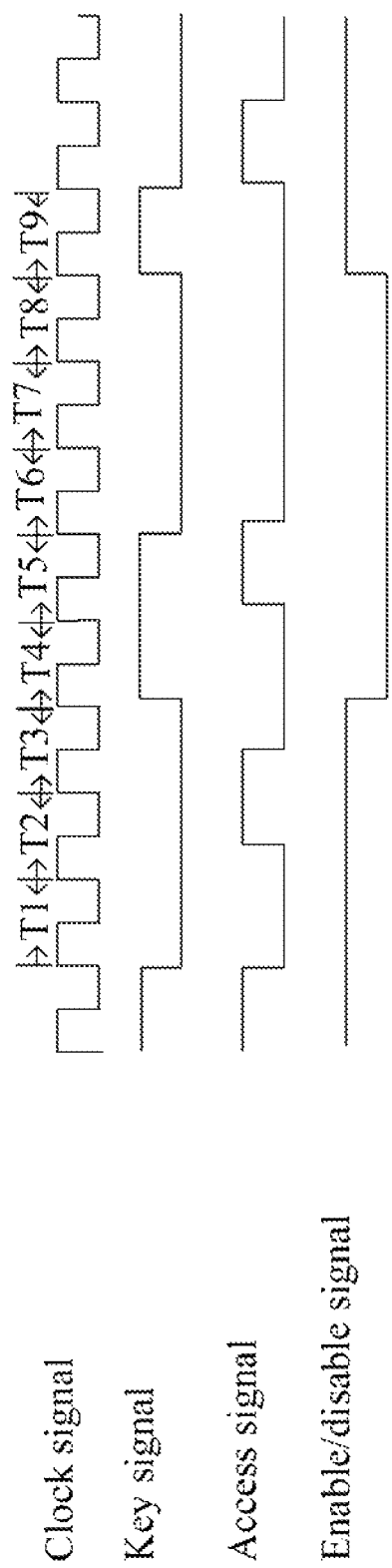
FIG. 4 is a waveform diagram of one embodiment of a signal generated by the protection circuit of FIG. 2 as disclosed.

FIG. 4 is a waveform diagram of one embodiment of a signal generated by the protection circuit 30 as disclosed. The key circuit 50 generates the key signal maintaining three cycles T1 to T3 when the key of the key circuit 50 is pressed at the T1 to T3 for the first time. Correspondingly, the first delayer 3101 generates the high level voltage delay signal at T2 to T4, the second delayer 3102 generates the high level voltage delay signal at T3 to T5, and the third delayer 3103 generates the high level voltage delay signal at T4 to T6, which means the first delayer 3101, the second delayer 3102 and the third delayer 3103 are all generate the high level voltage delay signals at T4. Thus, at the beginning of T4, the level of the output end of the AND gate 320 from a low voltage to a high voltage, and the fourth delayer 3400 is triggered. The fourth delayer 3400 delays the outputting signal having initial high level voltage outputted by the second NOT gate 330 for one cycle, and generates the delayed outputting signal to the input end of the third NOT gate 350, and the NOT gate 350 outputs the enable signal having a low level voltage to unlock the storage unit 40. In a word, if the processor 20 outputs the access signal, the protection circuit 30 transmits the access signal to the storage unit 40 to access to the data when the key circuit 50 generates the key signal having a low level voltage maintaining three cycles for the first time.

The level of the output end of the AND gate 320 is a low voltage, and the second delay unite 340 is not triggered, so the level of the output end of the second NOT gate 330 and that of the third NOT gate 350 maintain pre-level when the key circuit 50 does not generate the key signal maintaining at least three cycles The key circuit 50 generates the key signal maintaining three cycles T1 to T3 when the key of the key circuit 50 is pressed at the T6 to T8 for the second time. Correspondingly, the first delayer 3101 generates the high level voltage delay signals at T7 to T9, the second delayer 3102 generates the high level voltage delay signal at T8 to T10, and the third delayer 3103 generates the high level voltage delay signal at T9 to T11, which means the first delayer 3101, the second delayer 3102 and the third delayer 3103 are all generate the high level voltage delay signal at T4. Thus, at the beginning of T4, the level of the output end of the AND gate 320 from a low voltage to a high voltage, and the fourth delayer 3400 is triggered. The fourth delayer 3400 delays the outputting signal having a low level voltage outputted by the second NOT gate 330 for one cycle, and generates the delayed outputting signal to the input end of the third NOT gate 350, and the NOT gate 350 outputs the disable signal having a high level voltage to unlock the storage unit 40. In a word, no matter whether the processor 20 outputs the access signal, the protection circuit 30 outputs a disable signal to lock the storage unit 40 when the key circuit 50 generates the key signal having a low level voltage maintaining three cycles for the second time.

In this analogy, theory of the key circuit 50 generating the key signal maintaining three cycles for the third time is similar to that of the key circuit 50 generates the key signal maintaining three cycles for the first time. Moreover, theory of the key circuit 50 generating the key signal maintaining three cycles for the fourth time is similar to that of the key circuit 50 generating the key signal maintaining three cycles for the second time.

The protection circuit 30 of the electronic device 10 generates the enable signal or the disable signal according to the key signal and the clock signal, to control the storage unit 40 unlock or lock, and then to prevent trojan programs purloining the data of storage unit 40.

The foregoing disclosure of the various embodiments has been presented for purposes of illustration and description. It is not intended to be exhaustive or to limit the invention to the precise forms disclosed. Many variations and modifications of the embodiments described herein will be apparent to one of ordinary skill in the art in the light of the above disclosure. The scope of the invention is to be defined only by the claims appended hereto and their equivalents.

What is claimed is:

1. An electronic device, comprising:
a key circuit that generates a key signal;
a processor that generates an access signal;
a storage unit that stores data;
a clock signal generating circuit that generates a clock signal; and
a protection circuit that generates an enable signal or a disable signal according to the key signal and the clock signal to control the storage unit to unlock or lock, the protection circuit transmitting the access signal to the storage unit to access the data when the storage unit is unlocked;
wherein the protection circuit comprises a first NOT gate, a first delay unit, an AND gate, a second delay unit, a second NOT gate, a third NOT gate and an OR gate, an input end of the first NOT gate connects to the key circuit to receive the key signal and invert the key signal to an inverted key signal, the first delay unit connects to an output end of the first NOT gate and the clock signal generating circuit, the first delay unit delays the inverted key signal to a plurality of delay signals according to the clock signal, input ends of the AND gate connects to a plurality of output ends of the first delay unit to receive the delay signals, a first input end of the second delay unit connects to an output end of the AND gate, an input end of the second NOT gate connects to an output end of the second delay unit, an output end of the second NOT gate connects to a second input end of the second delay unit, an input end of the third NOT gate connects to the output end of the second delay unit, an output end of the third NOT gate generates an enable signal or a disable signal to control the storage unit to unlock or lock, and a first input end of the OR gate connects to the output end of the third NOT gate to receive the enable signal or the disable signal, a second input end of the OR gate connects to the processor to receive the access signal, and an output end of the OR gate connects to the storage unit.

2. The electronic device of claim 1, wherein the first delay unit comprises:
a first delayer comprising a control end to receive the clock signal, an input end connected to an output end of the first NOT gate, and an output end connected to a first input end of the AND gate;
a second delayer comprising a control end to receive the clock signal, an input end connected to the output end of the first delayer, and an output end connected to a second input end of the AND gate; and
a third delayer comprising a control end to receive the clock signal, an input end connected to the output end of the second delayer, and an output end connected to a third input end of the AND gate.

3. The electronic device of claim 2, wherein the first delayer is rising edge triggered.

4. The electronic device of claim 2, wherein the second delayer is rising edge triggered.

5. The electronic device of claim 2, wherein the third delayer is rising edge triggered.

6. The electronic device of claim 1, wherein the second delay unit comprises a fourth delayer, wherein a first input end of the fourth delayer is connected to the output end of the AND gate, a second input end of the fourth delayer is connected to the output end of the second NOT gate, and an output end of the fourth delayer is connected to the input end of the second NOT gate and the input end of the third NOT gate.

7. The electronic device of claim 6, wherein the fourth delayer is rising edge triggered.

* * * * *